United States Patent [19]
Kashima et al.

[11] Patent Number: 5,111,340
[45] Date of Patent: May 5, 1992

[54] LENS DEVICE

[75] Inventors: Hiroyuki Kashima; Naohisa Kinoshita, both of Nagoya, Japan

[73] Assignee: Brother Kogyo Kabushiki Kaisha, Nagoya, Japan

[21] Appl. No.: 618,730

[22] Filed: Nov. 27, 1990

[30] Foreign Application Priority Data

Jan. 10, 1990 [JP] Japan ................... 2-3850

[51] Int. Cl.$^5$ ............................................. G02B 7/02
[52] U.S. Cl. ................................ 359/819; 359/820; 359/216
[58] Field of Search .............. 350/6.7, 6.8, 252, 253, 350/243, 242, 257, 479, 480, 481, 245, 255, 247

[56]  References Cited

U.S. PATENT DOCUMENTS

| 3,904,276 | 9/1975 | Whitaker et al. | 359/819 |
| 4,303,306 | 12/1981 | Ookawa | 359/819 |
| 4,733,945 | 3/1988 | Bacich | 359/820 |
| 4,762,395 | 8/1988 | Gordon et al. | 359/820 |
| 4,850,674 | 7/1989 | Hasselskog | 359/820 |
| 4,854,671 | 8/1989 | Hanke et al. | 359/819 |

FOREIGN PATENT DOCUMENTS

| 26706 | 2/1984 | Japan | 359/820 |
| 31915 | 2/1984 | Japan | 359/820 |
| 230609 | 11/1985 | Japan | 359/820 |
| 6446713 | 2/1989 | Japan . | |

Primary Examiner—Loha Ben
Attorney, Agent, or Firm—Oliff & Berridge

[57]  ABSTRACT

Laser light emitted from a light source is deflected in a predetermined direction by a rotary polygonal mirror to scan the surface of a photosensitive medium. A correction lens corrects the focal point of the laser light deflected by the rotary polygonal mirror. The correction lens is formed by cutting a circular lens along a plane off the optical axis thereof and removing a segment of shorter arc therefrom. The correction lens is held by a lens holder by way of being pressed by a pressing member both in the radial direction and in the direction of the optical axis thereof to the lens holder.

15 Claims, 3 Drawing Sheets

LENS DEVICE

BACKGROUND OF THE INVENTION

1. Field of the Invention

This invention relates to a laser scanning apparatus suitable for use on a laser printer or the like.

2. Description of the Prior Art

In the art of laser scanning apparatus, it has been the usual practice to deflect a laser beam by means of a rotary polygonal mirror, thereby scanning a photosensitive medium with the laser beam after correcting its focal point according to the deflection angle through a correction lens. For example, Japanese Patent Laid-Open No. 46713/1989 describes a laser scanning apparatus of this sort employing a correction lens which is formed by linearly cutting off upper and lower portions of a circular lens in such a manner as to provided parallel upper and lower faces on the opposite sides of the optical axis of the lens. The lower face of the correction lens, serving as a mounting surface, is held in intimate contact with a base plate which has a lens positioning means projectingly provided thereon, and a resilient lid member is fitted over the upper face of the correction lens and fittingly engaged with the positioning means. A projection formed on the resilient lid member is abutted against the upper marginal edge of the correction lens to push the same against the base plate and the positioning means, thereby holding the lens fixedly in position.

Generally, at the time of mounting a correction lens on a laser scanning apparatus, high accuracy is required with regard to the position of the optical axis of the lens. However, in the conventional laser scanning apparatus in which the position of the optical axis is determined on the basis of the mounting surface formed by a lens cutting operation, high accuracy is required not only with respect to the base plate and the positioning member but also on the mounting surface of the correction lens. It follows that the mounting surface needs high precision cutting and machining operations which lengthen and complicate the lens machining process and considerably increase production costs.

SUMMARY OF THE INVENTION

It is therefore an object of the present invention to provide a laser scanning apparatus which contributes to simplifying the machining process of the correction lens while achieving highly accurate positioning of the correction lens to guarantee picture images of high quality without impairing the compactness of the apparatus.

According to the present invention, there is provided a laser scanning apparatus in which laser light emitted from a light source is deflected in a predetermined direction by a rotary polygonal mirror to scan the surface of a photosensitive medium, the laser scanning apparatus comprising: a correction lens for correcting the focal point of the laser light deflected by the rotary polygonal mirror according to a deflection angle, the correction lens being formed by cutting a circular lens along a plane off the optical axis thereof and removing a segment of shorter arc therefrom; a lens holder including a frame arranged to abut against an arcuate peripheral portion of the correction lens to hold the latter in position both in the radial direction of the lens and in the direction of the optical axis; and pressing means for pressing the correction lens both in the radial direction and in the direction of the optical axis thereof to hold the lens in position relative to the lens holder.

BRIEF DESCRIPTION OF THE DRAWINGS

The above and other objects, features and advantages of the invention will become apparent from the following description and the appended claims, taken in conjunction with the accompanying drawings which show the invention by way of a preferred embodiment and in which:

DETAILED DESCRIPTION OF THE PREFERRED EMBODIMENT

Figure 1:
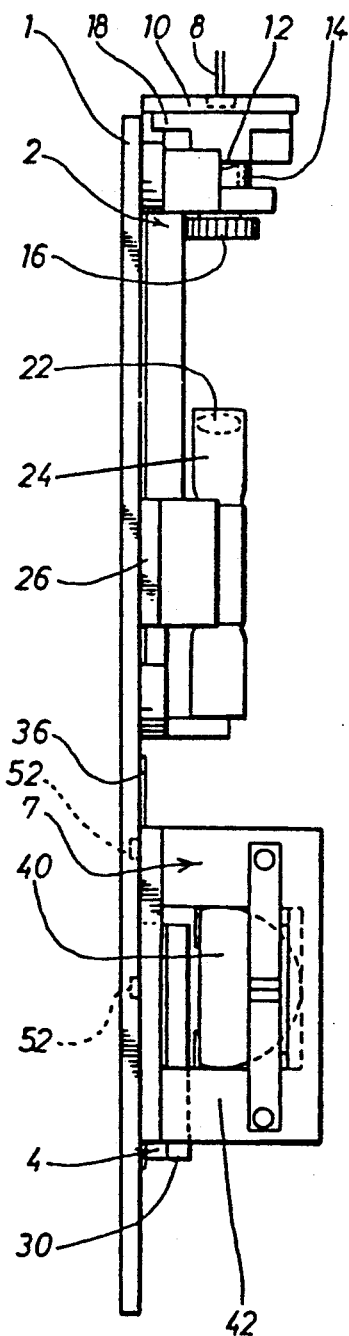
FIG. 1 is a side view of a laser scanning apparatus embodying the present invention.

Hereafter, the invention is described more particularly by way of the preferred embodiment shown in the drawings.

Figure 2:
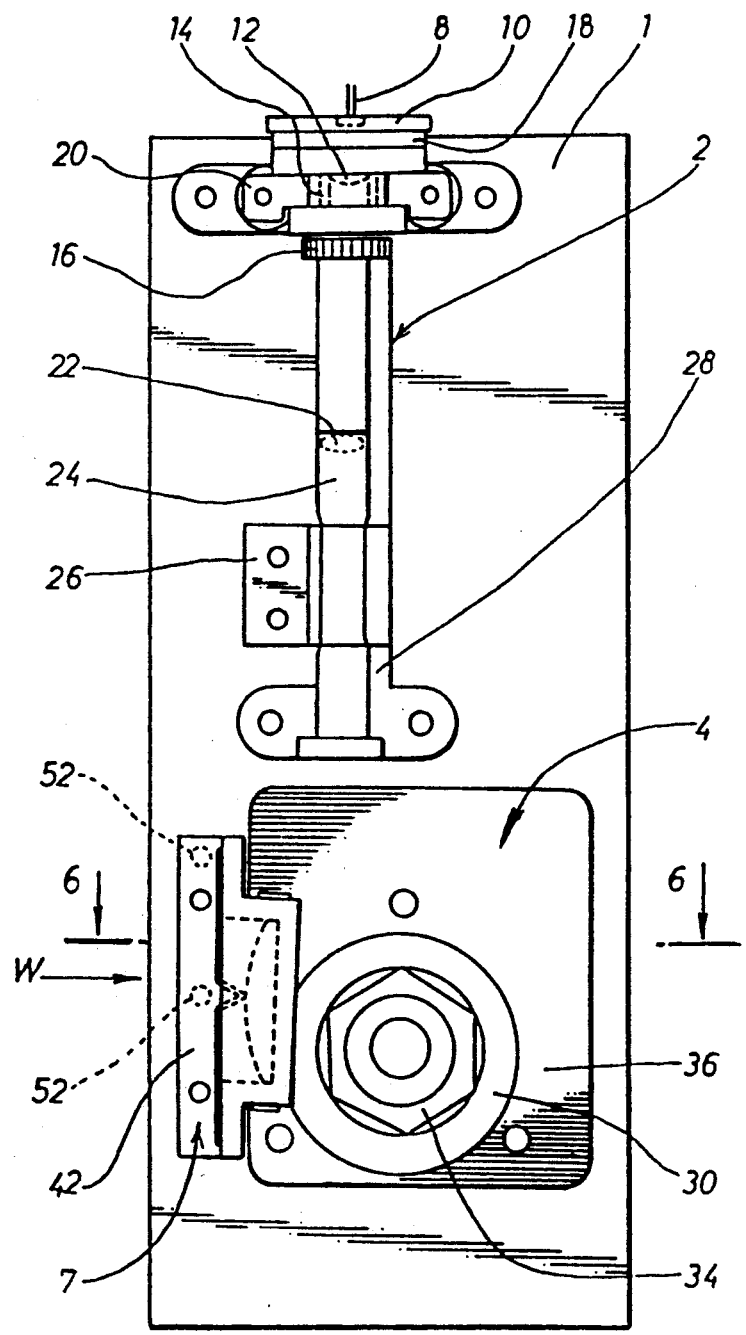
FIG. 2 is a plan view of the laser scanning apparatus.

Referring to FIGS. 1 and 2 which show the laser scanning apparatus of the invention in side and plan views respectively. The reference numeral 1 denotes a base plate for mounting thereon a laser beam producing unit 2, a polygon scanner unit 4 and a correction lens unit 7.

The laser beam producing unit 2 (hereinafter referred to simply as "laser unit" for brevity) has a semiconductor laser-emitting device 8 (hereinafter referred to simply as "LD" for brevity) retained in an LD holder 10 as a light source. The laser unit 2 is provided with a collimator lens 12 for collimating the laser light which is emitted from the LD 8 toward a polygon mirror 34, which will be described later. The collimator lens 12 is retained in position by a collimator lens holder 14. Further, the laser unit 2 is provided with a collimator lens focusing member 18 with a knob 16 for adjusting the distance between the LD 8 and the collimator lens 12. The collimator lens focusing member 18 is fixed in position by a fixing member 20. The laser unit 2 is further provided with a beam-forming lens 22, which forms the collimated laser light into a beam, and a beam-forming lens holder 24 which retains the beam-forming lens 22 in position. In turn, the beam-forming lens holder 24 is fixed in position by a spring member 26. These component parts are integrally supported on a frame 28 and mounted on the base plate 1 through the frame 28 which is fixed to the base plate 1.

The polygon scanner unit 4 includes a polygon mirror 34 which is rotated by a polygon motor 30 to serve as a rotary polygonal mirror. These parts are integrally supported on a polygon mirror drive base plate 36. The polygon motor drive base plate 36 is fixed on the base plate 1 to support the polygon scanner unit 4 in a predetermined position on the base plate 1.

Referring to FIGS. 3–6, details of the correction lens unit 7 are discussed below.

Figure 3:
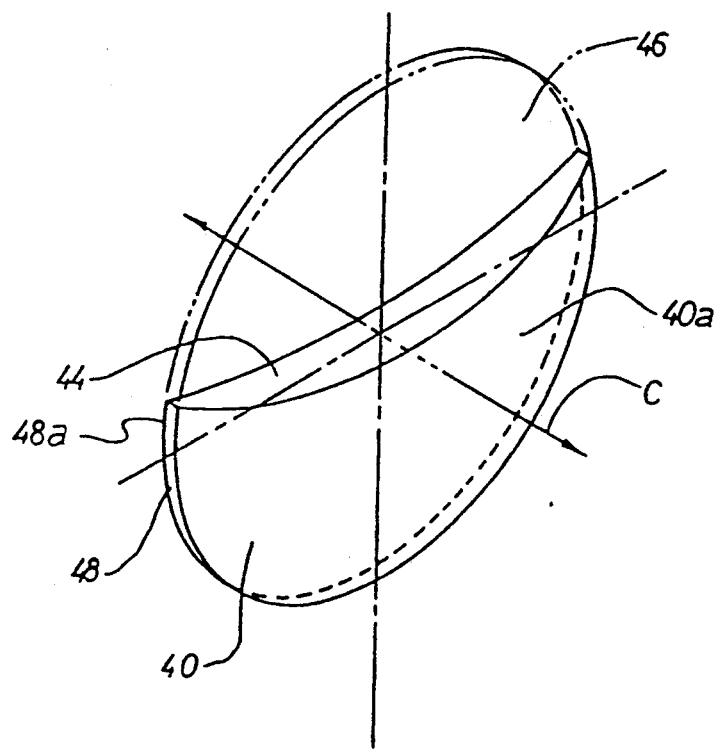
FIG. 3 is a perspective view of an fθ lens according to the invention, showing the outer shape of the lens.

FIG. 3 shows in a perspective view the shape of the fθ lens 40 which is employed as a correction lens in the present embodiment. The periphery 48 of the original lens, including a segment indicated by the two-dot chain line in FIG. 3, is a high precision true circle having an optical axis C at the center thereof, and a plane of high precision flatness defined by the back edges 48a of the peripheral portion 48, the plane lying perpendicular to the optical axis C. This fθ lens 40 has a greater arc than a semi-circle and is formed by cutting the original lens along a plane off the optical axis C and removing a segment 46 with a shorter arc. The cutting operation does not require especially high accuracy in forming the flat surface on a cut area 44 and can therefore be performed by a simple cutting operation. The flat cut surface 44 is preferred to be formed at a position as close to the optical axis C as possible to minimize the size of the fθ lens 40.

Figure 4:
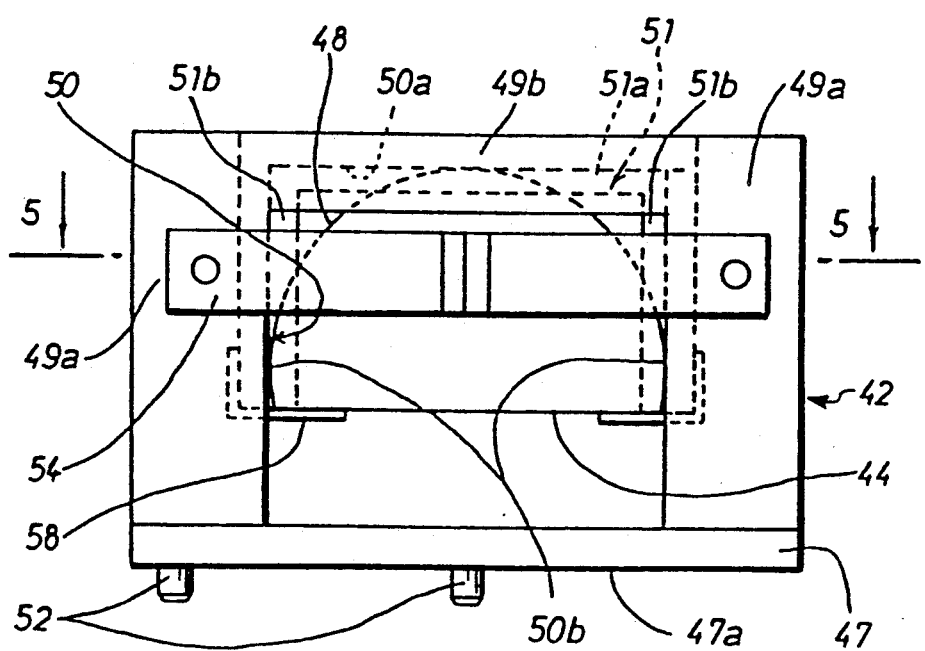
FIG. 4 is a view taken in the direction of arrow W in FIG. 2 with the fθ lens in its operative orientation.
Figure 5:
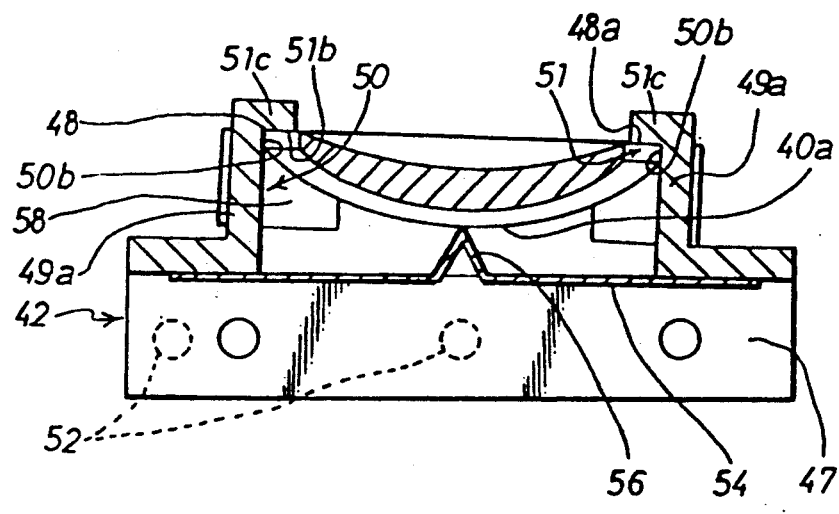
FIG. 5 is a sectional view taken on line 5—5 of FIG. 4.
Figure 6:
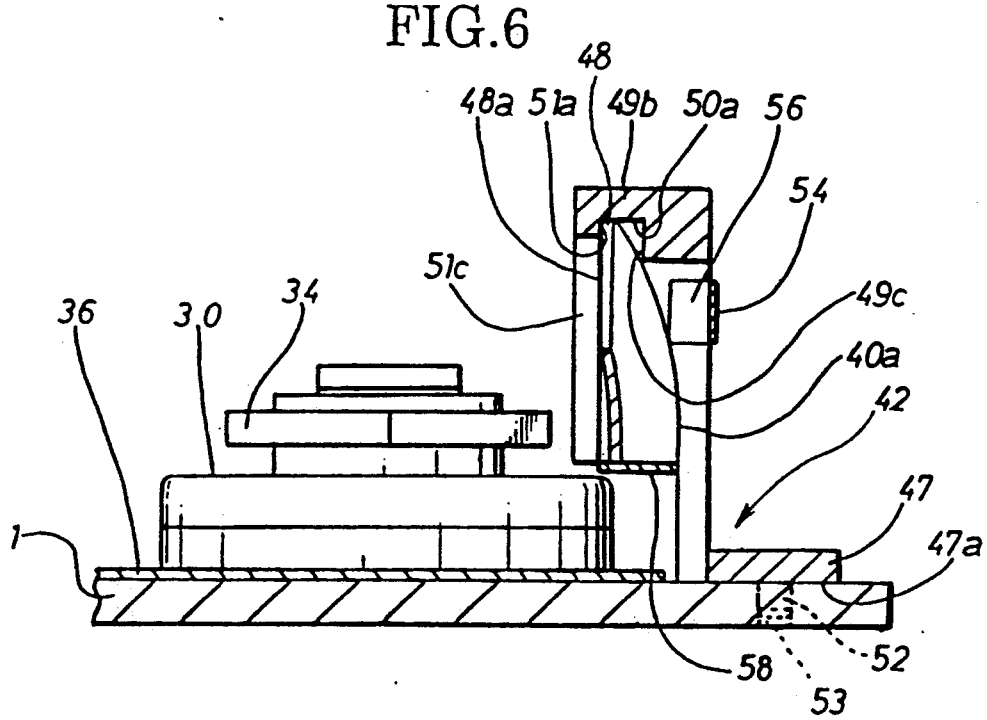
FIG. 6 is a sectional view taken on line 6—6 of FIG. 2.

As shown in FIGS. 4 to 6, a lens holder 42 is provided with an adapter plate 47 for fixation to the base plate 1. A pair of opposing columns 49a integrally extending from the adaptor plate 47 are provided with flat surfaces 50b in face to face relation with each other. A beam 49b which is bridged between the columns 49a is provided with a U-shaped groove 49c linearly along the length thereof, the groove 49c having its bottom surface 50a disposed in face to face relation with the adapter plate 47. The bottom surface 50a of the groove 49c and the opposingly disposed flat surfaces 50b of the columns 49a constitute a radial reference surface 50 which is to be held in contact with the arcuate peripheral portion 48 of the fθ lens 40 at three spaced positions to determine the position of the fθ lens in the radial direction thereof.

Each one of the columns 49a is provided with a ledge 51c which extends longitudinally therealong in face to face relation with a similar ledge 51c on the other column 49a. A surface 51b of each of these two ledges 51c is located in the same plane as side surface 51a of the groove 49c to provide an axial reference surface 51 which determines the position of the fθ lens 40 in the direction of the optical axis C.

In this manner, in the present embodiment, the frame-like lens holder 42 is constituted by the adapter plate 47, the pair of columns 49a and beam 49b. The radial and axial reference surfaces 50 and 51 are not restricted to the U-shape as employed in this embodiment, and may be formed in an arcuate or V-shape or in any other shape as long as they can determine the position of the fθ lens 40 in the radial and axial directions by circumscribing contact with the peripheral portion 48 of the fθ lens 40.

The adapter plate 47 is provided with a couple of positioning projections 52 in predetermined spaced positions on its bottom surface 47a. These positioning projections 52 are fittingly engageable with positioning holes 53, which are formed in the base plate 1, thereby fixedly mounting the lens holder 42 in a predetermined position on the base plate 1.

The correction lens unit 7 includes an axial pressing member 54 which is abutted against the convex surface 40a of the fθ lens 40 to press the peripheral portion 48 of the fθ lens 40 against the axial reference surface 51 upon mounting the fθ lens 40 on the lens holder 42. In this particular embodiment, the axial pressing member 54 is in the form of a resiliently deformable leaf spring of rectangular shape which is folded at a longitudinally median point to provide a ridge 56 to be abutted against the convex surface 40a of the fθ lens 40. Needless to say, the axial pressing member 54 may be in a form other than a leaf spring as long as it is capable of pressing the peripheral portion 48 against the axial reference surface 51.

The correction lens unit 7 is further provided with a radial pressing member 58 which is abutted against the cut surface 44 of the fθ lens 40 when the latter is mounted on the lens holder 42, thereby pressing the fθ lens 40 against the radial reference surface 50. In this particular embodiment, the radial pressing member 58 is a pair of rectangular leaf springs. The leaf springs are abutted against opposite end portions of the cut surface 44 of the fθ lens 40 to press the peripheral portion 48 of the fθ lens 40 against the radial reference surface 50. Needless to say, the axial and radial pressing members 54 and 58 which are formed separately in this embodiment may be integrated into a unitary structure if desired.

The correction lens unit 7 is assembled in the following order. First, the fθ lens 40 is inserted into the lens holder 42 from the side away from the cut surface 44 until the peripheral portion 48 fits in the groove 49c. By so doing, the peripheral portion 48 of the fθ lens 40 is abutted against the radial and axial reference surfaces 50 and 51 of the lens holder 42. At the time of inserting the fθ lens 40 into the lens holder 42, the assembling job can be facilitated by dropping the fθ lens 40 into the lens holder 42 which is held in such a posture that the bottom surface 50a of the groove 49c on the beam 49b is faced upward. At this time, the fθ lens 40 is unlikely to drop in the direction of the convex surface 40a because the peripheral portion 48 fits in the groove 49c. Then, the axial pressing member 54 is mounted on the columns 49a, whereupon the ridge portion 56 is abutted against the convex surface 40a of the fθ lens 40, exerting a pressure on the fθ lens 40 to hold the peripheral portion 48 against the axial reference surface 51. Then, the radial pressing member 58 is mounted on the columns 49a, the fθ lens 40 is thereby pressed in the radial direction to hold the peripheral portion 48 against the radial reference surface 50. In this manner, the fθ lens 40 is fixed in position in the radial and axial directions relative to the lens holder 42 by the actions of the pressing members 54 and 58.

After positioning and fixing the fθ lens 40 relative to the lens holder 42 in the above-described manner, the projections 52 on the lens holder 42 are engaged with the positioning holes 53 on the base plate 1 to mount the fθ lens 40 on the base plate 1 with the cut surface 44 in face to face relation with the base plate 1.

During operation of the laser scanning apparatus of this embodiment, the laser light emitted from LD 8 is collimated through the collimator lens 12. The resultant collimated laser light is formed into a beam through the beam-forming lens 22. The laser beam is deflected in a predetermined direction by the rotating polygon mirror 34 to scan the surface of a photosensitive medium through the accurately positioned fθ lens 40 which corrects the focal point according to the deflection angle of the beam.

As is clear from the foregoing description, in the laser scanning apparatus according to the present invention, the location of the optical axis of the fθ lens 40 is determined by the accurately shaped peripheral portion 48 of the original lens instead of the cut surface 44. In contrast to the prior art which requires a lengthy and complicated machining process involving high precision operations for forming a cut surface to be relied upon for determination of the optical axis position, what is required in the present invention involves only a simple cutting operation free of any high precision requirement, simplifying and reducing the cost of the machining process for the fθ lens itself. In addition, since the peripheral portion 48 has an arcuate shape, the direction of the optical axis C is not changed even if the contacting positions of the radial and axial reference surfaces 50 and 51 and the fθ lens 40 are shifted relative to the peripheral portion 48 due to rotation of the fθ lens 40 about the optical axis C. Accordingly, the fθ lens 40 and the lens holder 42 can be assembled with high efficiency because there is no need to pay special attention to positional deviations due to rotation of fθ lens 40 about its optical axis C during assembly.

Furthermore, the fθ lens 40 is fixed in the lens holder 42 with the cut surface 44 faced toward the base plate 1, so that it is unnecessary to provide a wide space between the base plate 1 and the position of the optical axis C. It follows that the polygon mirror 34 may be located in a position close to the base plate 1, without spacing from the latter, to maintain the compactness of the laser scanning apparatus as a whole.

It is to be understood that the present invention is not restricted to the particular forms shown in the foregoing embodiment, and can be put into practice in various modified forms without departing from the scope of the invention as encompassed by the appended claims.

What is claimed is:

1. A lens device for a laser scanning apparatus in which a laser light is deflected in a predetermined direction by a rotary polygonal mirror, the lens device comprising:
    a correction lens for correcting the focal point of said laser light deflected by said rotary polygonal mirror according to a deflection angle, said correction lens being formed by cutting a circular lens along a plane off an optical axis thereof and removing a segment of shorter arc therefrom;
    a lens holder including a frame arranged to abut against an arcuate peripheral portion of said correction lens to hold the latter in position both in the radial direction of the lens and in the direction of the optical axis; and
    pressing means for pressing said correction lens both in the radial direction and in the direction of the optical axis thereof to hold said lens in position relative to said lens holder.

2. A lens device as claimed in claim 1, wherein said pressing means presses said correction lens against said lens holder in the direction of the optical axis by way of pressing a convex surface of said correction lens.

3. A lens device as claimed in claim 1, wherein said pressing means presses said correction lens against said lens holder in the radial direction of said correction lens by way of pressing a flat cut surface of said correction lens.

4. A lens device as claimed in claim 1, wherein said pressing means includes an axial pressing member to press said correction lens to said lens holder by way of pressing a convex surface of said correction lens and a radial pressing member to press said correction lens to said lens holder by way of pressing a flat cut surface of said correction lens.

5. A lens device as claimed in claim 1, wherein said lens holder includes a groove in which the arcuate peripheral portion of said correction lens is held.

6. A lens device as claimed in claim 1, further comprising a base member on which said polygonal mirror is attached, wherein said lens holder is detachably mounted on said base member.

7. A lens device for a laser scanning apparatus in which a laser light is deflected in a predetermined direction by a rotary polygonal mirror, the lens device comprising:
    a base plate;
    a correction lens holder mounted to said base plate;
    a correction lens, said correction lens having a circular shape with a single segment removed; and
    retention means for retaining said correction lens in said correction lens holder.

8. A lens device as claimed in claim 7, wherein said correction lens holder comprises:
    an adaptor plate;
    two columnar projections extending upwardly from said adapter plate, said two columnar projections spaced apart in an opposing relationship; and
    a beam extending between upper ends of said two columnar projections.

9. A lens device as claimed in claim 8, wherein said two columnar projections and said beam have a continuous groove on an inner surface, said groove receiving an edge of said correction lens at a circular portion thereof.

10. A lens device as claimed in claim 8, wherein said adapter plate has at least two projections extending from a lower surface and said base plate has at least two openings for receiving said at least two projections thereby fixedly and accurately mounting said correction lens holder to said base plate.

11. A lens device as claimed in claim 7, wherein said retention means comprises a first means extending from a first of said two columnar projections to a second of said two columnar projections for pressing said correction lens in a direction of an optical axis thereof; and
    a second means for pressing said correction in a radial direction by engaging a flat surface of said correction lens produced by removing said segment.

12. A lens device comprising:
    a base plate;
    a correction lens holder comprising an adapter plate having two ends for mounting to said base plate, a column projecting upwardly from each end of said adaptor plate, and a beam connecting an upper end of each of said columns;
    a circular correction lens having a segment removed so as to form a flat surface offset from an optical axis thereof, said correction lens received in said correction lens holder at an arcuate edge; and
    retention means for retaining said correction lens in said correction lens holder.

13. A lens device as claimed in claim 12, wherein said retention means comprises:
    a first means extending between said columns and engaging a convex surface of said correction lens to press said correction lens in a direction parallel to said optical axis; and
    a second means for pressing said correction lens in a radial direction by engaging a flat surface of said correction lens.

14. A lens device as claimed in claim 12, further comprising a radial reference surface and an axial reference surface on an inner surface of each of said columns and said beam of said correction lens holder.

15. A lens device as claimed in claim 14, wherein said radial and axial reference surfaces are continuous along one of said columns, said beam and the other of said columns.

* * * * *